US012266463B2

(12) United States Patent
Yen et al.

(10) Patent No.: US 12,266,463 B2
(45) Date of Patent: Apr. 1, 2025

(54) TRANSFORMER DEVICE

(71) Applicant: Realtek Semiconductor Corporation, Hsinchu (TW)

(72) Inventors: Hsiao-Tsung Yen, Hsinchu (TW); Ting-Yao Huang, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 926 days.

(21) Appl. No.: 17/378,917

(22) Filed: Jul. 19, 2021

(65) Prior Publication Data

US 2022/0208435 A1 Jun. 30, 2022

(30) Foreign Application Priority Data

Dec. 30, 2020 (TW) ................................ 109146795

(51) Int. Cl.
*H01F 27/28* (2006.01)
*H01F 27/29* (2006.01)

(52) U.S. Cl.
CPC ......... *H01F 27/2804* (2013.01); *H01F 27/29* (2013.01)

(58) Field of Classification Search
CPC .................................................. H01F 27/2804
USPC ........................................................ 336/225
See application file for complete search history.

(56) References Cited

U.S. PATENT DOCUMENTS

| | | | |
|---|---|---|---|
| 10,153,078 | B2 | 12/2018 | Yen et al. |
| 10,186,364 | B2 | 1/2019 | Yen et al. |
| 10,340,880 | B2 | 7/2019 | Yen |
| 2017/0012601 | A1 | 1/2017 | Yen |
| 2019/0237238 | A1 | 8/2019 | Yen et al. |
| 2020/0251550 | A1 | 8/2020 | Yen et al. |
| 2020/0312511 | A1 | 10/2020 | Yen et al. |
| 2022/0130591 | A1 | 4/2022 | Yen et al. |

FOREIGN PATENT DOCUMENTS

| | | | |
|---|---|---|---|
| TW | I699791 | B | 7/2020 |
| TW | I722974 | B | 3/2021 |
| TW | I727815 | B | 5/2021 |
| TW | I727904 | B | 5/2021 |

*Primary Examiner* — Ronald Hinson
(74) *Attorney, Agent, or Firm* — Troutman Pepper Locke; Tim Tingkang Xia, Esq.

(57) ABSTRACT

A transformer device includes a first and a second trace, a first and a second connection member, and a first input/output member. A second sub-trace of the first trace is coupled to a first sub-trace of the first trace at a first and a second area. The first connection member is coupled to the first and the second sub-trace. The first and a third sub-trace of the second trace are disposed in turn. A fourth sub-trace of the second trace is coupled to the third sub-trace at the first and the second area. The second and the fourth sub-trace are disposed in turn. The second connection member is coupled to the third and the fourth sub-trace. The first sub-trace includes first wires, and the first input/output member is coupled to the first wire which is located at an inner side among the first wires.

20 Claims, 6 Drawing Sheets

TRANSFORMER DEVICE

RELATED APPLICATIONS

This application claims priority to and the benefit of Taiwan Application Serial Number 109146795, filed on Dec. 30, 2020, the entire contents of which are incorporated herein by reference as if fully set forth below in its entirety and for all applicable purposes.

BACKGROUND

Field of Invention

The present disclosure relates to an electronic device. More particularly, the present disclosure relates to a transformer device.

Description of Related Art

The various types of inductors according to the prior art have their advantages and disadvantages. For example, inductance density of a transformer, having crossing structure, is low. In addition, Q value of stacked-type transformer is low. Therefore, the scopes of application of the above transformers are limited.

SUMMARY

The foregoing presents a simplified summary of the disclosure in order to provide a basic understanding to the reader. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

One aspect of the present disclosure is to provide a transformer device. The transformer device includes a first trace, a first connection member, a second trace, a second connection member, and a first input/output member. The first trace includes a first sub-trace and a second sub-trace. The first sub-trace is located on a first layer. The second sub-trace is located on a second layer, and coupled to the first sub-trace at a first area and a second area respectively. The first area and the second area are connected to each other at a junction. The first connection member is coupled to the first sub-trace and the second sub-trace. The second trace includes a third sub-trace and a fourth sub-trace. The third sub-trace is located on the first layer, and disposed in turn with the first sub-trace at the first area and the second area respectively. The fourth sub-trace is located on the second layer, coupled to the third sub-trace at the first area and the second area respectively, and disposed in turn with the second sub-trace at the first area and the second area respectively. The second connection member is coupled to the third sub-trace and the fourth sub-trace. The first input/output member is disposed at the first area. The first sub-trace includes a plurality of first wires, and the first input/output member is coupled to the first wire which is located at an inner side among the first wires. The first input/output member is located on a third layer.

Therefore, based on the technical content of the present disclosure, the magnetic field generated by the traces of the transformer device of the present disclosure during operation can be mutually canceled. Therefore, the inductance value of the transformer device of the present disclosure at common mode is low. Besides, the transformer device adopting the structural configuration of the present disclosure can improve the second harmonic. The design of the present disclosure is mainly transformer devices with stacked-type spiral inductors. The first trace is winded from the outer side to the inner side, and then winded from the inner side to the outer side on another metal layer. More than one stacked-type inductance wire is disposed on the same layer or disposed at the left side or the right side.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

According to the usual mode of operation, various features and elements in the figures have not been drawn to scale, which are drawn to the best way to present specific features and elements related to the disclosure. In addition, among the different figures, the same or similar element symbols refer to similar elements/components.

DESCRIPTION OF THE EMBODIMENTS

To make the contents of the present disclosure more thorough and complete, the following illustrative description is given with regard to the implementation aspects and embodiments of the present disclosure, which is not intended to limit the scope of the present disclosure. The features of the embodiments and the steps of the method and their sequences that constitute and implement the embodiments are described. However, other embodiments may be used to achieve the same or equivalent functions and step sequences.

Unless otherwise defined herein, scientific and technical terminologies employed in the present disclosure shall have the meanings that are commonly understood and used by one of ordinary skill in the art. Unless otherwise required by context, it will be understood that singular terms shall include plural forms of the same and plural terms shall include the singular. Specifically, as used herein and in the claims, the singular forms "a" and "an" include the plural reference unless the context clearly indicates otherwise.

Figure 1:
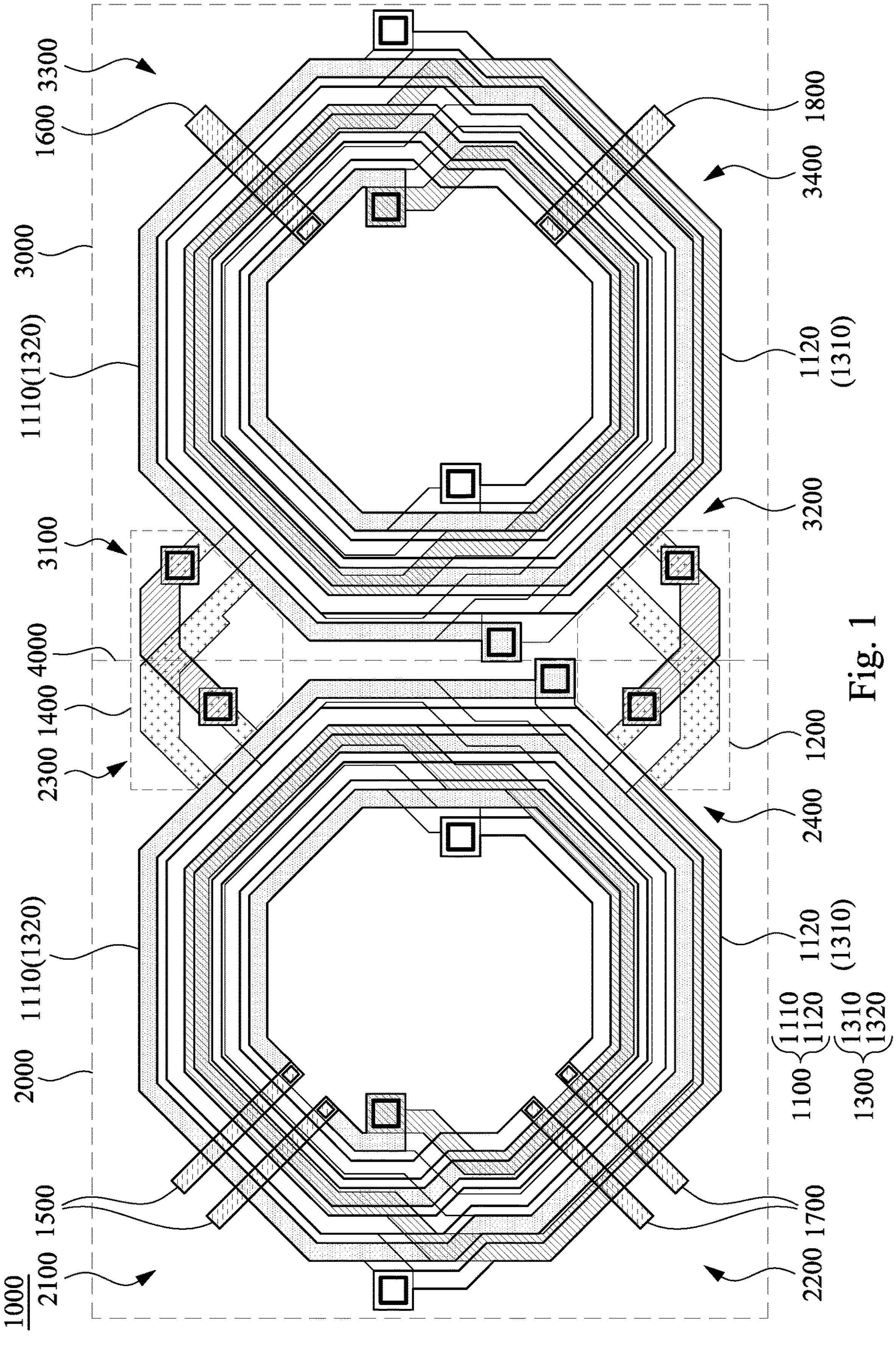
FIG. 1 depicts a schematic diagram of a transformer device according to one embodiment of the present disclosure.

FIG. 1 depicts a schematic diagram of a transformer device 1000 according to one embodiment of the present disclosure. As shown in the figure, the transformer device 1000 includes a first trace 1100, a first connection member 1200, a second trace 1300, a second connection member 1400, and a first input/output member 1500. The first trace 1100 includes a first sub-trace 1110 and a second sub-trace 1120. The second trace 1300 includes a third sub-trace 1310 and a fourth sub-trace 1320.

Figure 2:
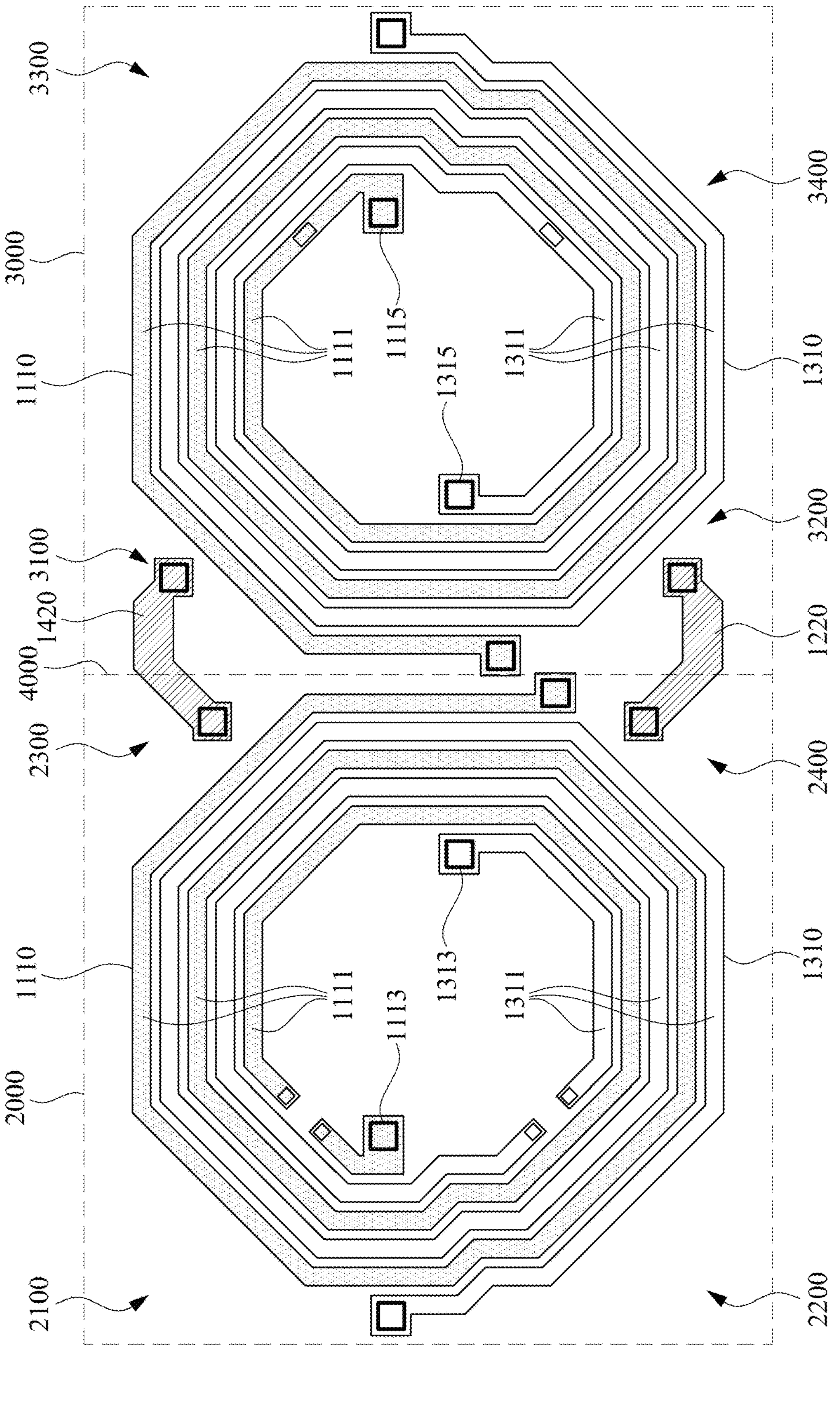
FIG. 2 depicts a schematic diagram of a partial structure of the transformer device shown in FIG. 1 according to one embodiment of the present disclosure.
Figure 3:
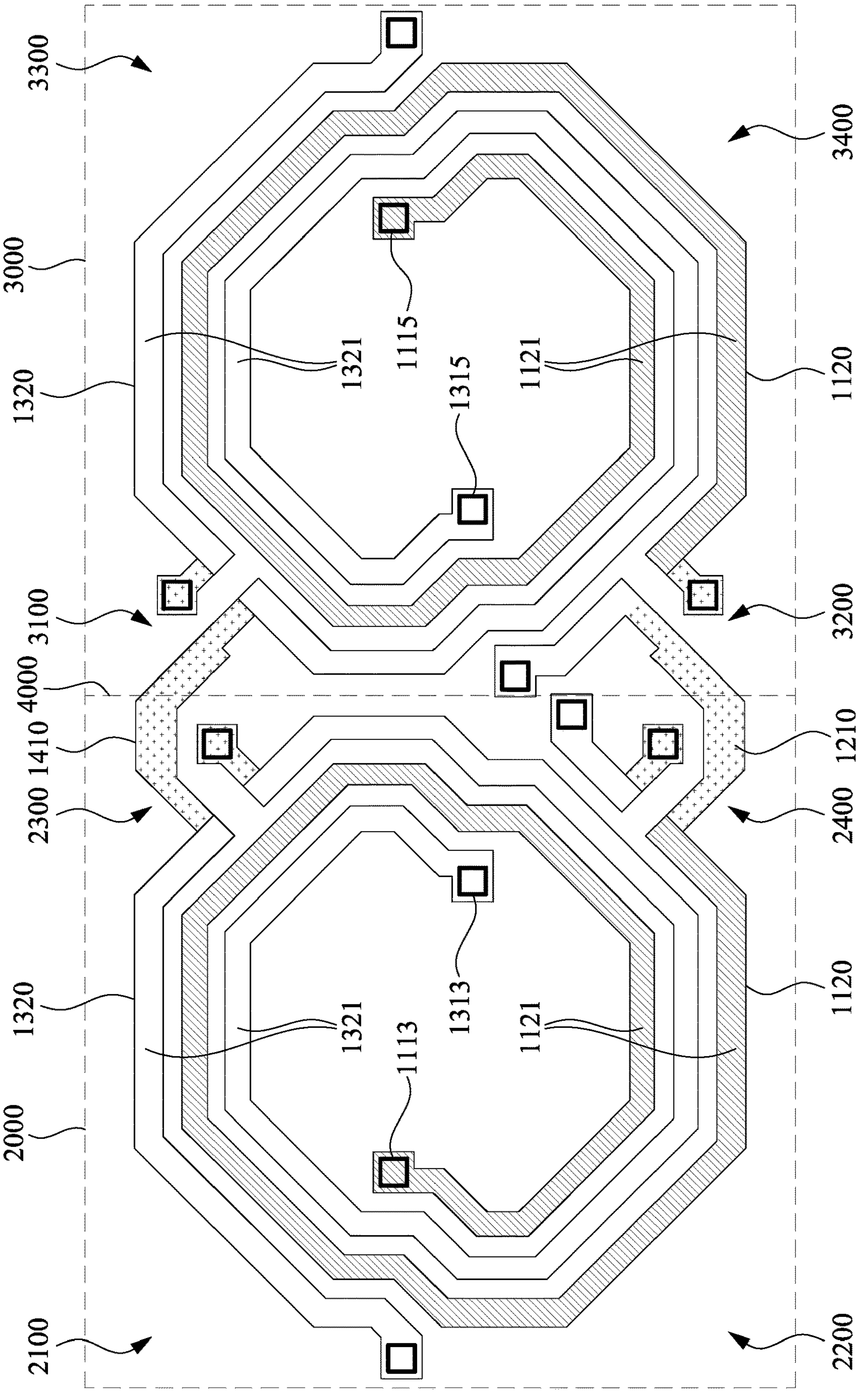
FIG. 3 depicts a schematic diagram of a partial structure of the transformer device shown in FIG. 1 according to one embodiment of the present disclosure.
Figure 6:
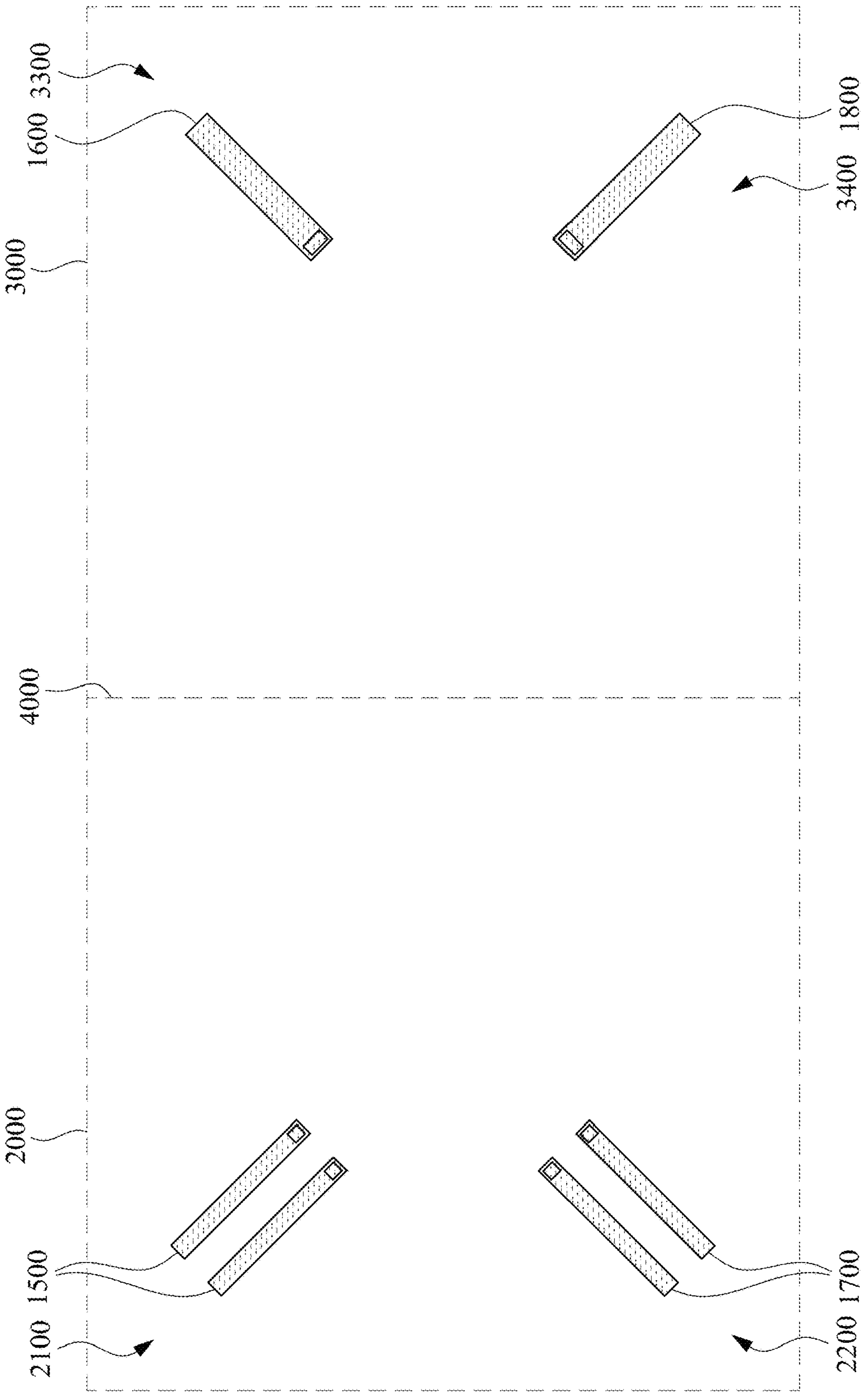
FIG. 6 depicts a schematic diagram of a partial structure of the transformer device shown in FIG. 1 according to one embodiment of the present disclosure.

For facilitating the understanding of the transformer device 1000 in FIG. 1, reference is now made to FIG. 2, FIG. 3, and FIG. 6. FIG. 2, FIG. 3, and FIG. 6 respectively illustrate partial structures of the transformer device 1000 shown in FIG. 1.

As shown in FIG. 2, the first sub-trace 1110 is located on a first layer. As shown in FIG. 3, the second sub-trace 1120 is located on a second layer. The second sub-trace 1120 is coupled to the first sub-trace 1110 in FIG. 2 at a first area 2000 and a second area 3000 respectively. For example, the first area 2000 is the area at left side of the figure, and the second area 3000 is the area at right side of the figure.

Besides, the first area 2000 and the second area 3000 are connected to each other at a junction 4000. The first connection member 1200 is disposed adjacent to the junction 4000, and couples the first sub-trace 1110 and the second sub-trace 1120.

Reference is now made to FIG. 2, the first sub-trace 1110 and the third sub-trace 1310 are all on the first layer, and the first sub-trace 1110 and the third sub-trace 1310 are disposed in turn at the first area 2000 and the second area 3000. For example, at the first area 2000, the sequence of the first sub-trace 1110 and the third sub-trace 1310 is that: "the first sub-trace 1110, the third sub-trace 1310, the first sub-trace 1110, and the third sub-trace 1310, and so on." Besides, the sequence of the first sub-trace 1110 and the third sub-trace 1310 at the second area 3000 is the same as the sequence of the first sub-trace 1110 and the third sub-trace 1310 at the first area 2000.

Reference is now made to FIG. 2, the third sub-trace 1310 is located on the first layer. Reference is now made to FIG. 3, the fourth sub-trace 1320 is located on the second layer, and the fourth sub-trace 1320 and the third sub-trace 1310 shown in FIG. 2 are coupled to each other at the first area 2000 and the second area 3000 respectively.

Reference is now made to FIG. 3, the second sub-trace 1120 and the fourth sub-trace 1320 are all located on the second layer, and the second sub-trace 1120 and the fourth sub-trace 1320 are disposed in turn at the first area 2000 and the second area 3000. For example, at the first area 2000, the sequence of the second sub-trace 1120 and the fourth sub-trace 1320 is that: "the second sub-trace 1120, the fourth sub-trace 1320, the second sub-trace 1120, the fourth sub-trace 1320, and so on." Besides, the sequence of the second sub-trace 1120 and the fourth sub-trace 1320 at the second area 3000 is the same as the sequence of the second sub-trace 1120 and the fourth sub-trace 1320 at the first area 2000.

Besides, the second connection member 1400 is disposed adjacent to the junction 4000, and couples the third sub-trace 1310 and the fourth sub-trace 1320.

Reference is now made to FIG. 2, the first sub-trace 1110 includes a plurality of first wires 1111. In addition, the first input/output member 1500 is disposed at the first area 2000, and coupled to the first wire 1111 which is located at an inner side among the first wires 1111. Reference is now made to FIG. 6, the first input/output member 1500 is located on a third layer.

In one embodiment, as shown in FIG. 2 and FIG. 6, the first input/output member 1500 is coupled to the first wire 1111 which is located at the innermost side among the first wires 1111.

Reference is now made to FIG. 3, the second sub-trace 1120 includes a plurality of second wires 1121. In the first area 2000, the first wire 1111 in FIG. 2 is coupled to the second wire 1121 in FIG. 3 through a via 1113. In the second area 3000, the first wire 1111 in FIG. 2 is coupled to the second wire 1121 in FIG. 3 through a via 1115.

Reference is now made to FIG. 2 and FIG. 6, the first input/output member 1500 includes a first terminal and a second terminal. The first terminal (e.g., the lower terminal as shown in the figure) of the first input/output member 1500 is coupled to the first wire 1111 which is located at an inner side among the first wires 1111. The second terminal (e.g., the upper terminal as shown in the figure) of the first input/output member 1500 is disposed opposite to the junction 4000, and located at a block at which the first sub-trace 1110 or the third sub-trace 1310 are not disposed. For example, the upper terminal of the first input/output member 1500 is disposed at a left side of the junction 4000 formed by the first area 2000 and the second area 3000, and located at the upper left block 2100 at which the first sub-trace 1110 or the third sub-trace 1310 are not disposed, wherein the upper left block 2100 is located at the upper left corner of the first area 2000.

In one embodiment, the transformer device 1000 further includes a first center-tapped 1600. The first center-tapped 1600 is disposed at the second area 3000, and coupled to the first wire 1111 which is located at an inner side among the first wires 1111. Besides, the first center-tapped 1600 is located on the third layer. In another embodiment, the first center-tapped 1600 is coupled to the first wire 1111 which is located at the innermost side among the first wires 1111.

In some embodiments, the first center-tapped 1600 includes a first terminal and a second terminal. The first terminal (e.g., the lower terminal as shown in the figure) of the first center-tapped 1600 is coupled to the first wire 1111 which is located at an inner side among the first wires 1111. The second terminal (e.g., the upper terminal as shown in the figure) of the first center-tapped 1600 is disposed at a side which is opposite to the junction 4000, and located at a block at which the first sub-trace 1110 or the third sub-trace 1310 are not disposed. For example, the upper terminal of the first center-tapped 1600 is disposed at a right side of the junction 4000 formed by the first area 2000 and the second area 3000, and located at the upper right block 3300 at which the first sub-trace 1110 or the third sub-trace 1310 are not disposed, wherein the upper right block 3300 is located at the upper right corner of the second area 3000.

Reference is now made to FIG. 1, FIG. 2, and FIG. 3, the first wires 1111 and the second wires 1121 are coupled to each other at a first side (e.g., the left side) and a second side (e.g., the right side) of the transformer device 1000 in an interlaced manner. In another embodiment, in the first area 2000, the multiple first wires 1111 and the second wires 1121 are coupled to each other at the left side and the right side in an interlaced manner. Besides, in the second area 3000, the first wires 1111 and the second wires 1121 are coupled to each other at the left side and the right side in an interlaced manner. It is noted that the present disclosure is not intended to be limited to the embodiments in FIG. 1, FIG. 2 and FIG. 3, the first wires 1111 and the second wires 1121 can also be coupled to each other at a third side (e.g., the upper side) and a fourth side (e.g., the lower side) of the transformer device 1000 in an interlaced manner, depending on actual requirements.

Reference is now made to FIG. 2, the third sub-trace 1310 includes a plurality of third wires 1311. Reference is now made to FIG. 3, the fourth sub-trace 1320 includes a plurality of fourth wires 1321. In the first area 2000, the third wires 1311 in FIG. 2 are coupled to the fourth wires 1321 in FIG. 3 through a via 1313. In the second area 3000, the third wires 1311 in FIG. 2 are coupled to the fourth wires 1321 in FIG. 3 through a via 1315.

Reference is now made to FIG. 2 and FIG. 6, the transformer device 1000 further includes a second input/output member 1700, and the second input/output member 1700 is disposed at the first area 2000, and coupled to the third wire 1311 which is located at an inner side among the third wires 1311. Besides, the second input/output member 1700 is located on the third layer. In another embodiment, the second input/output member 1700 is coupled to the third wire 1311 which is located at the innermost side among the third wires 1311.

In some embodiments, the second input/output member 1700 includes a first terminal and a second terminal. The first terminal (e.g., the upper terminal as shown in the figure) of the second input/output member 1700 is coupled to the third wire 1311 which is located at an inner side among the third wires 1311. The second terminal (e.g., the lower terminal as shown in the figure) of the second input/output member 1700 is disposed at a side which is opposite to the junction 4000, and located at a block at which the first sub-trace 1110 or the third sub-trace 1310 are not disposed. For example, the lower terminal of the second input/output member 1700 is disposed at a right side of the junction 4000 formed between the first area 2000 and the second area 3000, and located at the lower left block 2200 at which the first sub-trace 1111 or the third sub-trace 1310 are not disposed, wherein the lower left block 2200 is located at the lower left corner of the first area 2000.

In one embodiment, the transformer device 1000 further includes a second center-tapped 1800. The second center-tapped 1800 is disposed at the second area 3000, and coupled to the third wire 1311 which is located at an inner side among the third wires 1311. Besides, the second center-tapped 1800 is located on the third layer. In another embodiment, the second center-tapped 1800 is coupled to the third wire 1311 which is located at the innermost side among the third wires 1311.

In some embodiments, the second center-tapped 1800 includes a first terminal and a second terminal. The first terminal (e.g., the upper terminal as shown in the figure) of the second center-tapped 1800 is coupled to the third wires 1311 which is located at an outermost side among the third wires 1311. The second terminal (e.g., the lower terminal as shown in the figure) of the second center-tapped 1800 is disposed at a side which is opposite to the junction 4000, and located at a block at which the first sub-trace 1110 or the third sub-trace 1310 are not disposed. For example, the lower terminal of the second center-tapped member 1800 is disposed at a right side of the junction 4000 formed between the first area 2000 and the second area 3000, and located at the lower right block 3400 at which the first sub-trace 1110 or the third sub-trace 1310 are not disposed, wherein the lower right block 3400 is located at the lower right corner of the second area 3000.

Reference is now made to FIG. 1, FIG. 2, and FIG. 3, the third wires 1311 and the fourth wires 1312 are coupled to each other at a first side (e.g., the left side) and a second side (e.g., the right side) of the transformer device 1000 in an interlaced manner. In another embodiment, in the first area 2000, the third wires 1311 and the fourth wires 1312 are coupled to each other at the left side and the right side in an interlaced manner. Besides, in the second area 3000, the third wires 1311 and the fourth wires 1312 are coupled to each other at the left side and the right side in an interlaced manner. It is noted that the present disclosure is not intended to be limited to the embodiments in FIG. 1, FIG. 2 and FIG. 3, the third wires 1311 and the fourth wires 1312 can also be coupled to each other at a third side (e.g., the upper side) and a fourth side (e.g., the lower side) of the transformer device 1000 in an interlaced manner, depending on actual requirements.

In one embodiment, the first connection member 1200 is disposed at a block at which the first sub-trace 1110 and the second sub-trace 1120 are not disposed and which is adjacent to the junction 4000. For example, the first sub-trace 1110 and the second sub-trace 1120 are all octagonal traces. Therefore, an upper left block 2100, a lower left block 2200, an upper right block 2300, and a lower right block 2400 of the first area 2000 do not have any first sub-trace 1110 or any second sub-trace 1120 disposed therein. In other words, the blocks are empty blocks. Similarly, an upper left block 3100, a lower left block 3200, an upper right block 3300, and a lower right block 3400 of the second area 3000 do not have any first sub-trace 1110 or any second sub-trace 1120 disposed therein, and the blocks are empty blocks as well. The empty blocks of the transformer device 1000 of the present disclosure are used to dispose the first connection member 1200 so as to connect the first sub-trace 1110 and the second sub-trace 1120. However, the present disclosure is not limited to the foregoing embodiments in FIG. 2 and FIG. 3, the type of the first sub-trace 1110 and the second sub-trace 1120 can be set to be other type, for example, diamond, depending on actual requirement. Since there are empty blocks around a diamond trace, the first connection member 1200 can be disposed at the empty blocks as well.

In another embodiment, the second connection member 1400 is disposed at a block at which the third sub-trace 1310 and the fourth sub-trace 1320 are not disposed and which is adjacent to the junction 4000, and couples the third sub-trace 1310 and the fourth sub-trace 1320. For example, the third sub-trace 1310 and the fourth sub-trace 1320 are all octagonal traces. Therefore, an upper left block 2100, a lower left block 2200, an upper right block 2300, and a lower right block 2400 of the first area 2000 do not have any third sub-trace 1310 or any fourth sub-trace 1320 disposed therein. In other words, the blocks are empty blocks. Similarly, an upper left block 3100, a lower left block 3200, an upper right block 3300, and a lower right block 3400 of the second area 3000 do not have any third sub-trace 1310 or any fourth sub-trace 1320 disposed therein, and the blocks are empty blocks as well. The empty blocks of the transformer device 1000 of the present disclosure are used to dispose the second connection member 1400 so as to connect the third sub-trace 1310 and the fourth sub-trace 1320. However, the present disclosure is not limited to the foregoing embodiments in FIG. 2 and FIG. 3, the type of the third sub-trace 1310 and the fourth sub-trace 1320 can be set to be other type, for example, diamond, depending on actual requirement. Since there are empty blocks around a diamond trace, the second connection member 1400 can be disposed at the empty blocks as well.

Reference is now made to FIG. 1, FIG. 2 and FIG. 3, the first connection member 1200 is located on the first layer and the second layer at the same time, and the first layer is different from the second layer. For example, as shown in FIG. 3, the first connection member 1200 includes a first sub-connection member 1210 which is located on the second layer. The first sub-connection member 1210 couples the second sub-trace 1120 located at the first area 2000 and the second sub-trace 1120 located at the second area 3000, and is coupled to the first sub-trace 1110 in FIG. 2 through vias (e.g., the square structure shown in the figure). Besides, as shown in FIG. 2, the first connection member 1200 further includes a second sub-connection member 1220 which is located on the first layer. The second sub-connection member 1220 is coupled to the first sub-connection member 1210 in FIG. 3 through vias (e.g., the square structure shown in the figure), and couples the second sub-trace 1120 located at the first area 2000 and the second sub-trace 1120 located at the second area 3000 through the first sub-connection member 1210.

Reference is now made to FIG. 1, FIG. 2 and FIG. 3, the second connection member 1400 is located on the first layer and the second layer at the same time. For example, as shown in FIG. 3, the second connection member 1400 includes a third sub-connection member 1410 located on the second layer, and the third sub-connection member 1410 couples the fourth sub-trace 1320 located at the first area 2000 and the fourth sub-trace 1320 located at the second area 3000. Besides, reference is now made to FIG. 2, the second connection member 1400 further includes a fourth sub-connection member 1420 which is located on the first layer. The fourth sub-connection member 1420 is coupled to the third sub-connection member 1410 in FIG. 3 through vias (e.g., the square structure shown in the figure), couples the fourth sub-trace 1320 located at the first area 2000 and the fourth sub-trace 1320 located at the second area 3000 through the third sub-connection member 1410, and couples to the third sub-trace 1310 in FIG. 2 through the fourth sub-trace 1320 located at the upper left side of the second area 3000 and vias (e.g., the square structure shown in the figure).

In one embodiment, among the elements in FIG. 6, the first input/output member 1500, the first center-tapped 1600, the second input/output member 1700, and the second center-tapped 1800 are located on the third layer, and other elements are all located on the first layer. Besides, the elements shown in FIG. 3 are all located on the second layer. In other words, elements illustrated in FIG. 2 are all located on the first layer, elements illustrated in FIG. 3 are all located on the second layer, and elements illustrated in FIG. 6 are all located on the third layer. The first layer, the second layer, and the third layer are all different layers. It is noted that the present disclosure is not limited to the structure as shown in FIG. 1 to FIG. 3 and FIG. 6, and it is merely an example for illustrating one of the implements of the present disclosure.

Figure 4:
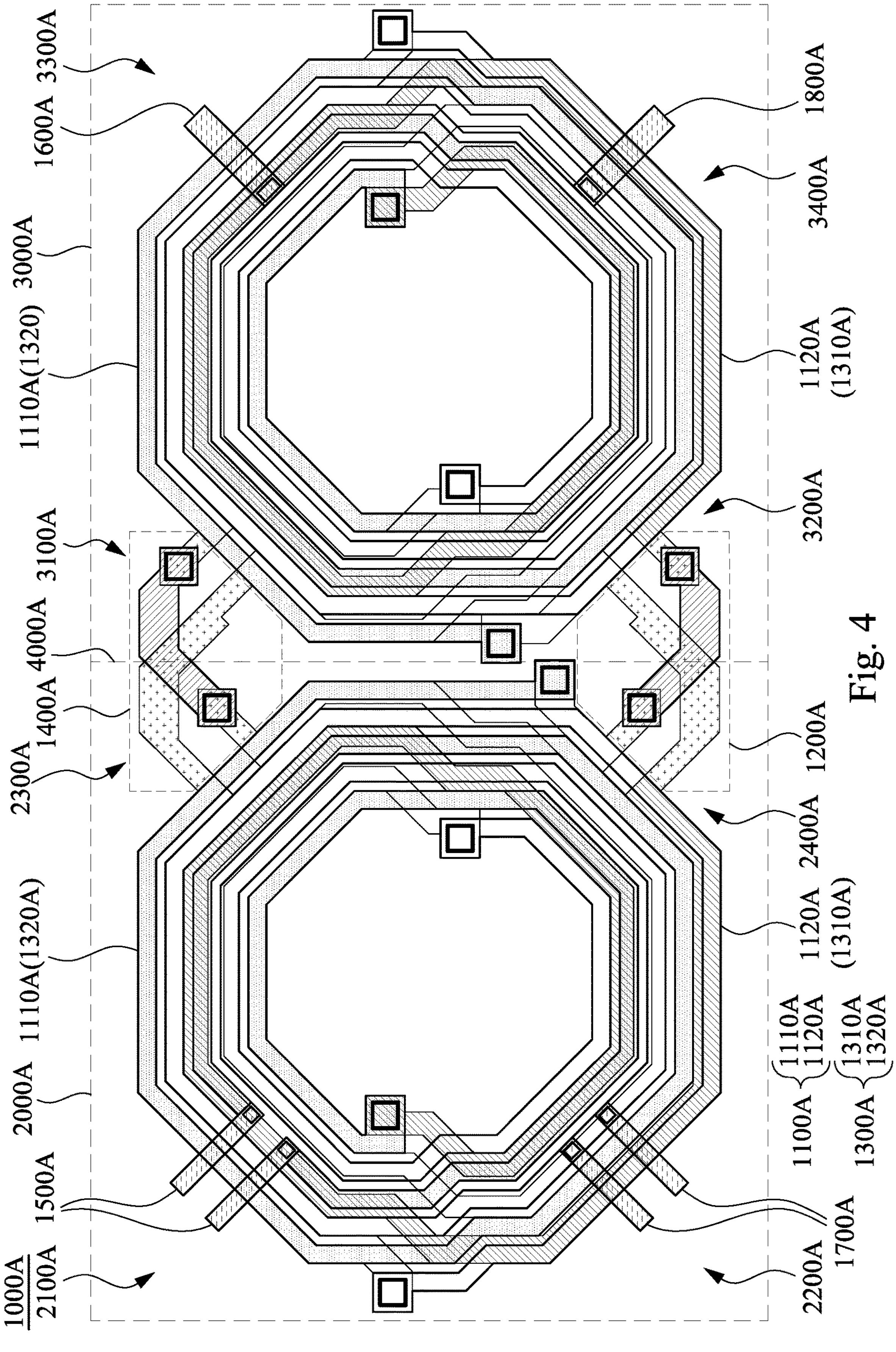
FIG. 4 depicts a schematic diagram of a transformer device according to one embodiment of the present disclosure.

FIG. 4 depicts a schematic diagram of a transformer device 1000A according to one embodiment of the present disclosure. Compared to the transformer device 1000 shown in FIG. 1 to FIG. 3, the first input/output member 1500A, the first center-tapped member 1600A, the second input/output member 1700A and the second center-tapped member 1800A of the transformer device 1000A in FIG. 4 are coupled to the middle wire (e.g., the second wire among three wires) of the corresponding first wire 1111 or the corresponding third wire 1311. It is noted that the element in FIG. 4, whose symbol is similar to the symbol of the element in FIG. 1 to FIG. 3, has similar structure feature in connection with the element in FIG. 1 to FIG. 3. Therefore, a detail description regarding the structure feature of the element in FIG. 4 is omitted herein for the sake of brevity. In addition, the present disclosure is not limited to the structure as shown in FIG. 4, and it is merely an example for illustrating one of the implements of the present disclosure.

Figure 5:
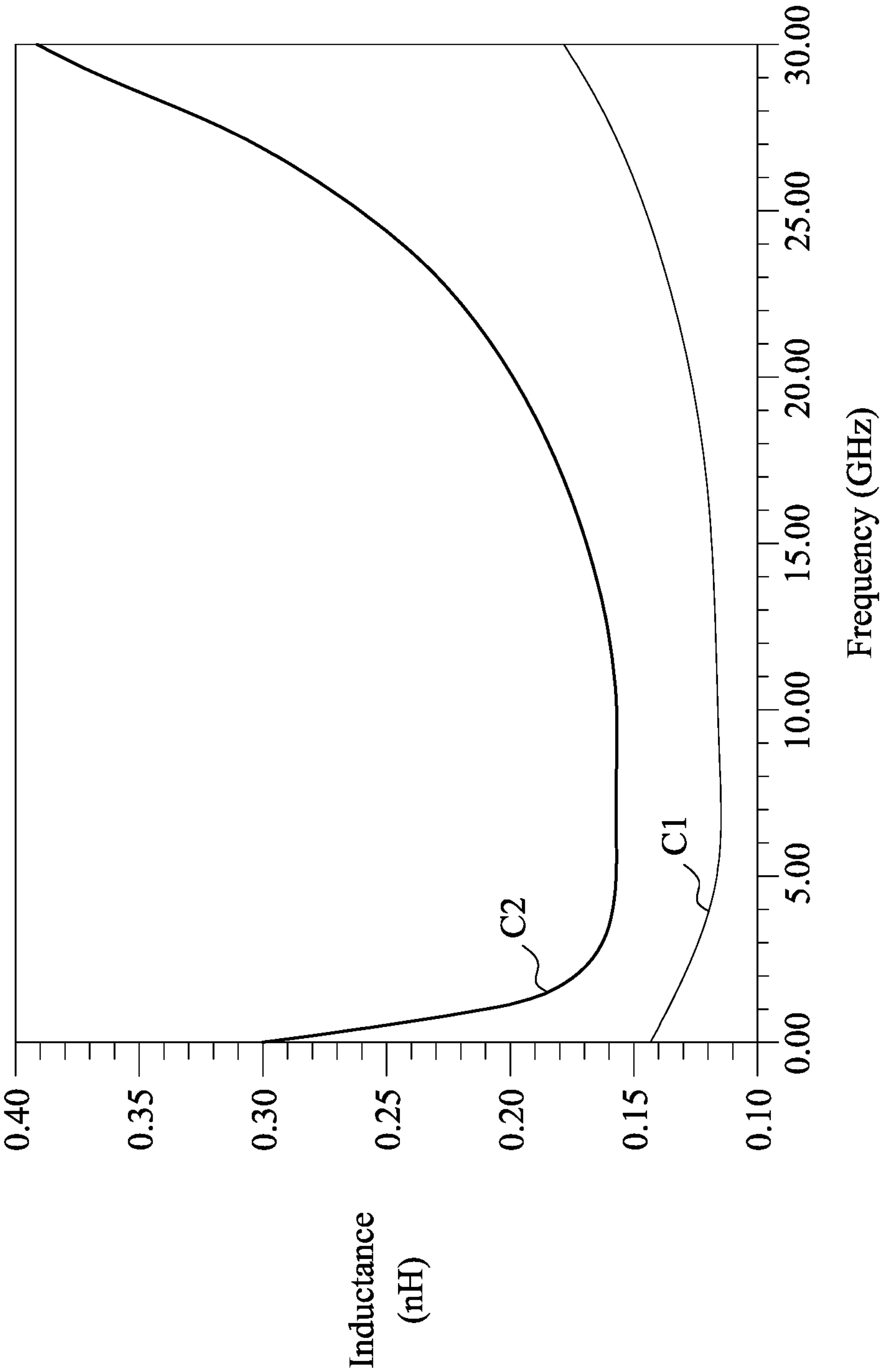
FIG. 5 depicts a schematic diagram of experimental data of a transformer device according to one embodiment of the present disclosure.

FIG. 5 depicts a schematic diagram of experimental data of a transformer device 1000 according to one embodiment of the present disclosure. As shown in the figure, the experimental curve of the inductance value of the transformer device 1000 adopting the structural configuration of the present disclosure at common mode is C1. Besides, the experimental curves of the inductance value of the transformer device which does not adopt the structural configuration of the present disclosure is C2. As can be seen from the figure, at a frequency of about 5 GHz, the transformer device 1000 adopting the structural configuration of the present disclosure at common mode has lower inductance value. Besides, the transformer device 1000 adopting the structural configuration of the present disclosure can improve the second harmonic about 8 dB. In one embodiment, the size of the transformer device 1000 is 130 μm×64 μm, the width of the transformer device 1000 is 2 μm, and the spacing of the transformer device 1000 is 1 μm. However, the present disclosure is not limited to the structure as shown in FIG. 5, and it is merely an example for illustrating one of the implements of the present disclosure.

It can be understood from the embodiments of the present disclosure that application of the present disclosure has the following advantages. The magnetic field generated by the traces of the transformer device of the present disclosure during operation can be mutually canceled. Therefore, the inductance value of the transformer device of the present disclosure at common mode is low. Besides, the transformer device adopting the structural configuration of the present disclosure can improve the second harmonic.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A transformer device, comprising:

a first trace, comprising:

a first sub-trace, located on a first layer; and a second sub-trace, located on a second layer, and coupled to the first sub-trace at a first area and a second area respectively, wherein the first area and the second area are connected to each other at a junction;

a first connection member, coupled to the first sub-trace and the second sub-trace;

a second trace, comprising:

a third sub-trace, located on the first layer, and disposed in turn with the first sub-trace at the first area and the second area respectively; and a fourth sub-trace, located on the second layer, coupled to the third sub-trace at the first area and the second area respectively, and disposed in turn with the second sub-trace at the first area and the second area respectively;

a second connection member, coupled to the third sub-trace and the fourth sub-trace; and a first input/output member, disposed at the first area, wherein the first sub-trace comprises a plurality of first wires, and the first input/output member is coupled to the first wire which is located at an inner side among the first wires, wherein the first input/output member is located on a third layer.

2. The transformer device of claim 1, wherein the first input/output member is coupled to the first wire which is located at the innermost side among the first wires.

3. The transformer device of claim 1, wherein the second sub-trace comprises a plurality of second wires.

4. The transformer device of claim 3, wherein the first input/output member comprises:

a first terminal, coupled to the first wire which is located at an inner side among the first wires; and a second terminal, disposed at a side which is opposite to the junction, and located at a block at which the first trace is not disposed.

5. The transformer device of claim 4, further comprising:

a first center-tapped, disposed at the second area, and coupled to the first wire which is located at an inner side among the first wires, wherein the first center-tapped is located on the third layer.

6. The transformer device of claim 5, wherein the first center-tapped is coupled to the first wire which is located at the innermost side among the first wires.

7. The transformer device of claim 5, wherein the first center-tapped comprises:

a first terminal, coupled to the first wire which is located at an inner side among the first wires; and a second terminal, disposed at a side which is opposite to the junction, and located on at a block at which the first sub-trace is not disposed.

8. The transformer device of claim 7, wherein the first wires and the second wires are coupled to each other at a first side and a second side of the transformer device in an interlaced manner.

9. The transformer device of claim 8, wherein the third sub-trace comprises a plurality of third wires, and the fourth sub-trace comprises a plurality of fourth wires.

10. The transformer device of claim 9, further comprising:

a second input/output member, disposed at the first area, and coupled to the third wire which is located at an inner side among the third wires, wherein the second input/output member is located on the third layer.

11. The transformer device of claim 10, wherein the second input/output member is coupled to the third wire which is located at the innermost side among the third wires.

12. The transformer device of claim 10, wherein the second input/output member comprises:

a first terminal, coupled to the third wire which is located at an inner side among the third wires; and a second terminal, disposed at a side which is opposite to the junction, and located at a block at which the third sub-trace is not disposed.

13. The transformer device of claim 12, further comprising:

a second center-tapped, disposed at the second area, and coupled to the third wire which is located at an inner side among the third wires, wherein the second center-tapped is located on the third layer.

14. The transformer device of claim 13, wherein the second center-tapped is coupled to the third wire which is located at the innermost side among the third wires.

15. The transformer device of claim 13, wherein the second center-tapped comprises:

a first terminal, coupled to the third wire which is located at an inner side among the third wires; and a second terminal, disposed at a side which is opposite to the junction, and located at a block at which the third sub-trace is not disposed.

16. The transformer device of claim 15, wherein the third wires and the fourth wires are coupled to each other at the first side and the second side of the transformer device in an interlaced manner.

17. The transformer device of claim 16, wherein the first connection member is disposed at a block at which the first sub-trace and the second sub-trace are not disposed and which is adjacent to the junction.

18. The transformer device of claim 17, wherein the second connection member disposed at a block at which the third sub-trace and the fourth sub-trace are not disposed and which is adjacent to the junction.

19. The transformer device of claim 18, wherein the first connection member is located on the first layer and the second layer, wherein the first layer is different from the second layer.

20. The transformer device of claim 19, wherein the second connection member is located on the first layer and the second layer.

* * * * *